United States Patent [19]

Schutte

[11] Patent Number: 5,319,454
[45] Date of Patent: Jun. 7, 1994

[54] CATV SYSTEM ENABLING ACCESS TO PREMIUM (PAY PER VIEW) PROGRAM EVENTS BY BAR CODE DATA ENTRY

[75] Inventor: Mark E. Schutte, Sugar Hill, Ga.

[73] Assignee: Scientific-Atlanta, Inc., Norcross, Ga.

[21] Appl. No.: 612,933

[22] Filed: Nov. 13, 1990

[51] Int. Cl.$^5$ .............................................. H04N 7/10
[52] U.S. Cl. .................................... 348/5.5; 455/4.2; 455/5.1; 348/7
[58] Field of Search .................... 358/84, 86; 455/3, 4, 455/5, 3.1, 4.1, 4.2, 5.1; 380/20; 235/375

[56] References Cited

U.S. PATENT DOCUMENTS

| | | | |
|---|---|---|---|
| 4,475,153 | 10/1984 | Kihara et al. | 340/309.15 |
| 4,578,571 | 3/1986 | Williams | 235/472 |
| 4,755,872 | 7/1988 | Bestler et al. | 358/86 |
| 4,912,760 | 3/1990 | West, Jr. et al. | 380/7 |
| 4,926,444 | 5/1990 | Hamilton et al. | 375/9 |
| 4,947,429 | 8/1990 | Bestler et al. | 358/84 |
| 4,963,966 | 10/1990 | Harney et al. | 358/349 |
| 5,003,384 | 3/1991 | Durden et al. | 358/86 |

FOREIGN PATENT DOCUMENTS 2034995 6/1980 United Kingdom ........... 340/309.15

OTHER PUBLICATIONS

Cochron, "Off-Premises Addressable System–Interdiction Through Jamming" published Aug. 1989.
Panasonic VCR module PV-4862 Operating Instructions circa 1989.

Primary Examiner—Reinhard J. Eisenzopf
Assistant Examiner—Edward Urban
Attorney, Agent, or Firm—Banner, Birch, McKie & Beckett

[57] ABSTRACT

In order to enable viewing of single events without requiring a CATV subscriber to order the event in advance, documents are distributed to subscribers containing cognizable (advertising) data concerning the event and a bar code symbol corresponding thereto. Each subscriber is provided with a transaction terminal enabling the entry of bar code data at any time and whenever the subscriber has the impulse to do so (impulse pay per view). The event codes are transmitted interactively from the transaction terminal to the equipment (a subscriber control unit) located off the subscribers' premises which normally interdicts the premium channels and thence to the head end of the CATV distribution system over the cables of the system. Data coming from the head end back to the subscriber control unit indicates that events are in progress (event number and premium channel data). When the event is in progress, the interdiction of the premium channel is inhibited so as to clear the channel to the subscribers' premises and permit the viewing of the premium program for the duration thereof. When a signal that the program is over, such as a new event code for the same channel is transmitted from the head end, information that the event has been viewed by the subscriber is stored together with the subscribers' address. This data is then transmitted to the head end for billing purposes.

14 Claims, 3 Drawing Sheets

CATV SYSTEM ENABLING ACCESS TO PREMIUM (PAY PER VIEW) PROGRAM EVENTS BY BAR CODE DATA ENTRY

DESCRIPTION

The present invention relates to a system (method and apparatus) of providing premium programs of events broadcast on premium channels of a CATV system (Community Antenna Television). The term CATV also includes systems of the type which distribute TV signals over satellites and other wireless links. The invention relates more particularly to a CATV system whereby subscribers may acquire and obligate themselves to pay for programs of individual events either in advance of the broadcast of the event over the CATV system or on demand thereby enhancing the system to provide pay per view (PPV) and impulse pay per view (IPPV) facilities.

The present invention is especially suitable for use in CATV distribution signals where equipment for authorizing and enabling authorized channels to be received by a subscriber is located off the subscribers' premises. Then the subscriber tunes his television set to the desired channel. If the desired channel is not an authorized channel, the reception is blocked, for example, by being interdicted with a jamming carrier in the off premises equipment, if the channel is authorized, it is then available for reception. The invention is, however, adapted for use in connection with CATV distribution systems where units, such as are known as set top converters or terminals, are located on the premises of the subscriber and control access to CATV channels including channels carrying premium signals which must be purchased individually in order to receive particular events, such as prize fights, first run moving pictures and the like.

In many CATV systems, a pay per view event is ordered through the use of telephone calls from subscribers to the cable operator who then authorizes the subscriber to receive the event, usually by sending an authorization signal which activates a descrambler in the set top converter used by the subscriber. Since time is required to allow the cable operator to program the set top converters to allow viewing of the event, the event must be ordered well in advance of the time that it is broadcast. Other systems utilize the set top converter as a subscriber interface. The set top converter is tuned by the subscriber to select the premium channel, then the subscriber enters his authorization number. The set top converter then activates its descrambler to allow the broadcast on the selected premium channel to be received. Information regarding the purchase is stored in the set top converter. The converter interface is provided with telephone connection circuits which place calls to the cable operator (or reverse path RF transmitters which transmit to the cable operator) and transfer data as to the pay per view events which were selected. Although such set top converter interfaces provide IPPV capability, they are not suitable when, instead of set top converters, off premises equipment deliver broad band signals to the subscribers. The off premises equipment has no knowledge of which channel the subscriber is watching and cannot relay billing information to the cable operator as to the events which have been selected.

Existing systems have the additional drawback of being prone to errors made by the subscriber. For example, the subscriber may have to enter, as with a keyboard, information as to which premium channel is desired, the time of day of the event and the subscribers' authorization number. More often than not, the subscriber entered data is in error. In other words, the need to enter data manually, and especially complex data, removes much of the advantage of an impulse system. There is therefore a need for a system which enables a subscriber to order a PPV event, especially on impulse, without the need for an interface which requires multiple entries of data and especially of complex data. It is also desirable to provide a system for acquiring premium programs without the need for an interface which also provides information as to the channel to which the subscriber is tuned so that PPV and IPPV capability may be included in a CATV distribution system using off premises equipment for the control of which channels a subscriber is entitled to receive.

It is therefore the principal object of the present invention to provide an improved CATV system (method and apparatus) which affords PPV and IPPV capability wherein the foregoing difficulties and disadvantages are substantially obviated.

It is another object of the present invention to provide an improved CATV system which has a transaction terminal enabling a subscriber to enter data which authorizes the reception of a PPV channel, when a PPV program is transmitted without entering complex or long codes, and particularly by the entry of data from a symbol representing the program to be viewed, such symbol preferably being a bar code.

It is a further object of the invention to provide an improved CATV system having an IPPV capability which requires the entry of data representing a PPV program event (an event number) for the program which is selected, such number being entered through the use of a bar code symbol.

Briefly described, the system of providing CATV programs of events broadcast on premium channels of a CATV distribution system during certain periods of time to subscribers connected to the system at various locations utilizes articles, such as cards containing cognizable information, such as advertisements, identifying the events and bar code symbols corresponding thereto. The subscribers are provided with a bar code entry terminal, preferably a device which reads the bar codes from the cards when they are passed through the device manually by the subscriber. Then, the bar codes for the desired events are read and first digital data signals corresponding thereto are generated. These first digital data signals are preferably transmitted from the subscriber locations back to the head end of the CATV system over the distribution network (the coaxial cable which connects the head end to the subscribers at their various locations), although telephone return may alternatively be used. These data signals are preferably supplied to and stored in a subscriber control unit, which controls the transmission of the premium channels by interdiction, located off the subscriber's premises and transmitted from the control unit back to the head end. The head end equipment transmits second digital signals which identifies the events and that they are in progress. In response to the second digital signals, the subscribers which cause the bar code symbols to be read are enabled to view the events when they are in progress. The subscriber control unit later forwards to the head end subscriber identification codes, and event identification codes for billing purposes after the event is over.

The foregoing and other objects, features and advantages of the invention as well as the best mode now known for practicing the invention and a presently preferred embodiment thereof, will become more apparent from a reading of the following description in connection with the accompanying drawings in which.

Figure 1:
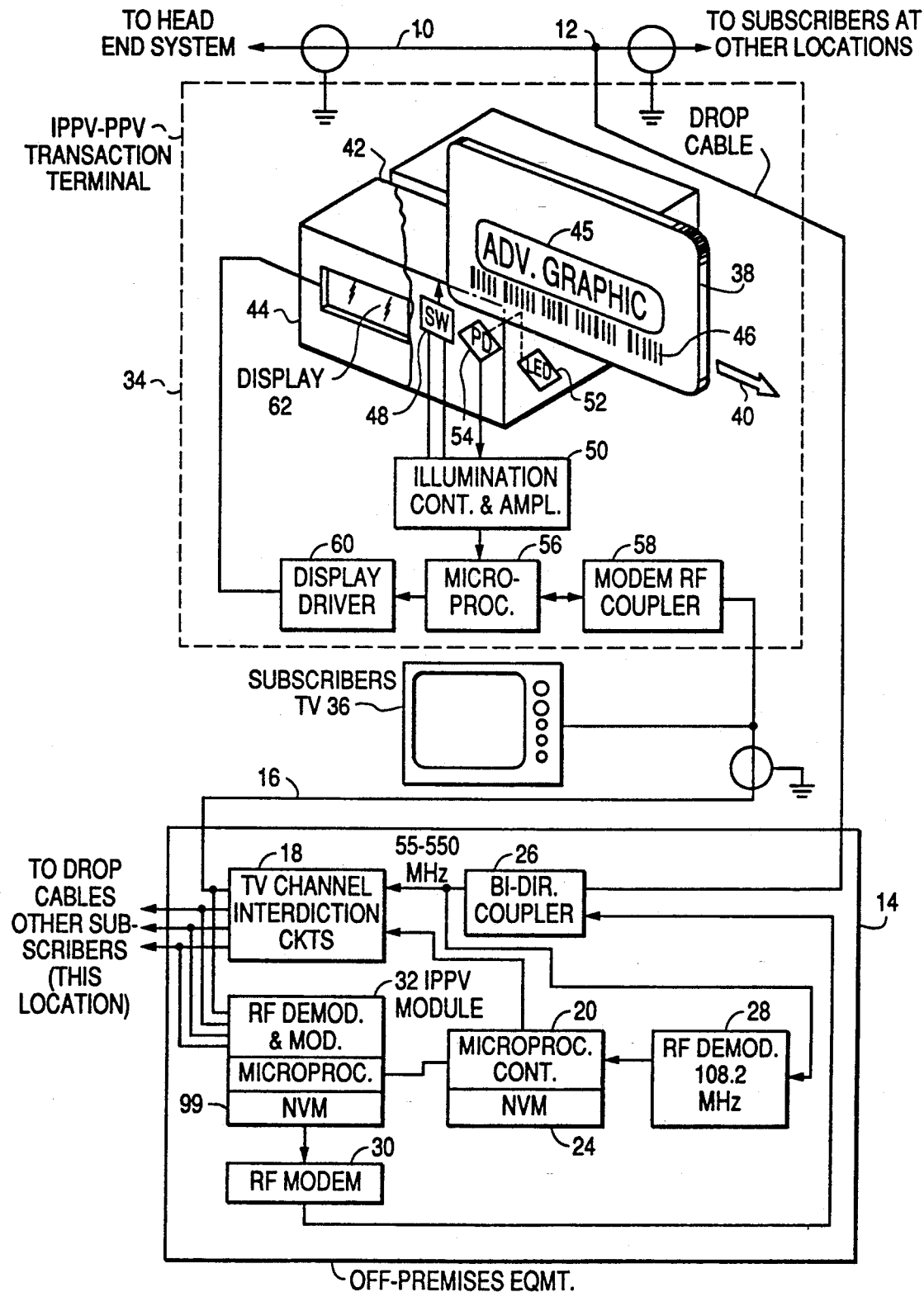
FIG. 1 is a schematic diagram showing one location where a plurality of subscribers are connected to a cable over which CATV signals are distributed via off premises equipment which delivers broad band signals to the subscribers and showing one IPPV-PPV transaction terminal whereby bar code data as to PPV programs (events) may be entered.

Referring to FIG. 1, a coaxial cable 10 represents a CATV distribution system which distributes broad band television signals generated in head end equipment oh the distribution system to subscribers at various locations, one of which is indicated by a connection 12 to the cable 10. Off premises equipment 14, which may be located along the cable 10, for example, on a pole or pedestal which carries the cable 10, enables authorized channels to be passed from the cable 10 to drop cables, such as the drop cable 16, extending between the equipment 14 and the subscribers' premises. This equipment is known as a subscriber control unit. Only one drop cable 16 is illustrated in detail in FIG. 1. There may be a plurality of other drop cables (for example three additional cables) which enable the equipment 14 to supply the broad band CATV signals to the other subscribers in the vicinity of the location 12. In the herein illustrated subscriber control unit 14, channels which are not authorized are blocked by interdiction circuits 18 by means of which jamming signals are injected under control of a microprocessor controller 20 having a nonvolatile memory (NVM) 24. The broad band signal from the head end, which in conventional CATV systems extends from 55 to 550 MHz, is coupled from the cable 10 by way of a bi-directional coupler 26 to the interdiction circuits 18. Authorization codes are transmitted on a control channel, conventionally at 108.2 MHz over the cable from the head end (via an RF signal at 108.2 MHz). This signal is demodulated in an RF demodulator 28 and inputted to the microprocessor controller 20.

The off premises equipment so far described is of a type presently available from Scientific Atlanta, Inc., Atlanta, Ga. 30348, U.S.A and known as Scientific Atlanta's Off-Premises Addressable System. This system is described in U.S. Pat. No. 4,963,966, filed Oct. 16, 1990 in the name of M. Harney, et al. and entitled "CATV Distribution System, Especially Adapted For Off-Premises Premium Channel Interdiction". See also application note by John Cochran entitled "Off-Premises Addressable System - Interdiction Through Jamming" published by Scientific Atlanta, Inc., 4311 Communications Drive, Atlanta, Ga. (August 1989). The interdiction circuits 18 and their controllers which respond to an address or authorization codes transmitted from the head end over the cable are described generally in the above referenced Harney, et al. patent. The interdiction circuits and their associated controllers are described in greater detail in U.S. patent application Ser. No. 166,302, filed Mar. 10, 1988 in the name of West, et al. now U.S. Pat. No. 4,912,760 issued Mar. 27, 1990.

In the off premises equipment 14, an RF modem 30 enables the off premises equipment to operate interactively with the head end by transmitting digital data signals through the coupler 26 on a channel in a frequency band below the band carrying the television signals, for example, a band from 15 to 30 MHz. This band may have two channels, one for carrying digital data signals back to the head end and the other for digital data signals used for PPV and IPPV purposes in the system. Alternatively, these later digital data signals may be sent on the 108.2 MHz channel using the RF demodulator 28. The signals which are transmitted from the head end contain data representing the event in progress in terms of its event number and the channel or jammer frequency slot in the interdiction circuits 18 over which the premium signals are transmitted (the particular PPV channel for the event).

There may be a large number of events scheduled in a given month. A five digit code may be used for designating the event by a unique number. It will be appreciated that manual entry of five digits by manual means, such as a key pad, makes errors quite likely. Such errors are multiplied if an authorization code corresponding to the subscriber requesting the event number must also be generated. The herein described system obviates the need for entry of such complex data, thereby reducing the error probability in the herein described CATV distribution system notwithstanding that the system has PPV and IPPV capability.

Transmission of digital signals on RF links such as the 108.2 MHz link or the 15-30 MHz links is preferably carried out using Manchester encoded frequency shift keyed (FSK) modulated signals. Such signals are preferably generated in modems such as described in U.S. patent application Ser. No. 07-187,978, entitled "Data Transmission Method and Apparatus by Period Shift Keying (PSK)", now U.S. Pat. No. 4,926,444 issued May 15, 1990.

The off premises equipment also utilizes an IPPV module 32 containing an RF demodulator and modulator circuit and a microprocessor having an associated nonvolatile memory (NVM). The module 32 and particularly the RF demodulator and modulator thereof is connected to the drop cables which are connected to the subscribers' premises at the location 12. This connection affords a channel below the television signal band, for example, from 5 to 15 MHz over which data entered at a transaction terminal 34 on the subscribers' premises, preferably in a box which may be located on top of the subscribers' TV set 36. The transaction terminal 34 is designed to read bar codes on articles (cards) 38, one of which is shown as it is being moved in the direction of the arrow 40 through a slot 42 in a so called "card-swipe" reader 44 of the terminal 34. While bar codes are preferred and provide flexibility and low cost, magnetic stripes, as on credit cards, may alternatively be employed to carry the symbols.

The card 38 is a typical card having cognizable information, particularly advertising graphics 45 printed thereon together with a bar code 46 which contains the event number of a specific, individual event. A package of such cards for all of the events which are being broadcast during a month may be provided to each subscriber together with his bill for the previous month's CATV service, or may be obtained from print advertising in newspapers or magazines. In order to select any event, either in advance or on impulse at any time while the event is in progress or when barker information concerning the event is being broadcast over a nonpremium channel, all that the subscriber needs to do is to move (swipe) the card for the selected event through the slot 42. The subscriber need not enter a five digit or other multi-digit number, nor does the subscriber have to enter an authorization code. The terminal 44 may have a platform on the upper surface of a bar underlying the slot on which surface the card can rest as it is swiped through the slot 42. This mechanism is not shown to simplify the illustration. The facility for doing away with the need for an authorization code is implemented in the programming of the microprocessors in the equipment 14 as will be discussed hereinafter. It will also be appreciated that bar code data entry may be made via other terminals than with a card swipe terminal, for example with a bar code scanner gun or through the use of a wand adapted to read bar codes.

The terminal 44 contains a switch, such as a micro switch 48, which operates an illumination controller and amplifier 50. The illumination controller supplies power, for example from the power lines (the electrical wiring) in the subscribers' premises to a light emitting diode LED 52. The light from the LED is directed to the bar code when the card 38 is placed in and while it is swiped through the terminal 44. This light is reflected or scattered and picked up by a photo detector 54 to provide an analog signal, amplified in the amplifier of the circuits 50. The optical elements (the LED) and photo detector and the associated amplifiers may be of the type conventionally used in bar code readers. A typical LED/photo detector system is shown in U.S. Pat. No. 4,578,571 issued Mar. 25, 1986 to which reference may be had if information as to the details of the illumination elements and optics and the analog circuits of a bar code reader are desired.

The terminal 34 has a microprocessor 56 which is connected over the 5-15 MHz link to the IPPV module 32 in the off premises equipment 14 via the drop cable 16. A modem and RF coupler circuit 58 in the terminal 34 is used for this purpose. This modem and coupler may use Manchester coded FSK modulation techniques such as described in the above-referenced U.S. application Ser. No. 07-187,978. The microprocessor also operates a display driver circuit 60 which drives a display 62 on the terminal box 44 which reads the event number inputted by the bar code 46 on the card 38. It may also read the time of day, if desired. The design of the display driver may be of the type generally used to drive liquid crystal or light emitting diode displays. The data link at 5-15 MHz is well below the TV signal band (55-550 MHz) which is carried by the drop cable to the subscriber's TV 36 so that data entry and the IPPV/PPV facilities provided by the terminal 34 and the off premises equipment 14 are in a noninterfering relationship.

Figure 2:
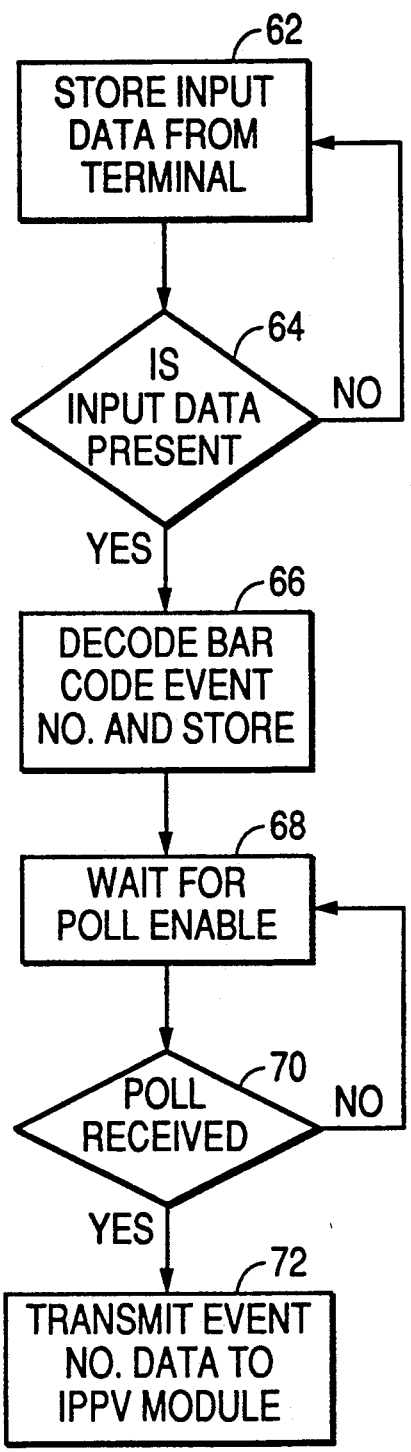
FIGS. 2 and 3 are flow charts illustrating the programming of microprocessors contained in the transaction terminal and in the off premises equipment.

The programming of the microprocessor 56 will become more apparent from FIG. 2. The programming of the microprocessors in the IPPV module 32 and in the controller 22 will become more apparent from FIG. 3.

As shown in FIG. 2, after the card 38 is swiped through the terminal, the microprocessor 56 receives digitized signals from the amplifier circuits 50 and stores these digitized signals as input data in the random access memory thereof. This storage process is shown at 62. A loop including a decision, (is input data present 64) recognizes the presence of data and that an event has been requested. Then, the microprocessor executes a decode process 66 and decodes and stores the event number. From time to time, for example every minute, a microprocessor in the IPPV module sends polling signals addressed to each of the subscribers (the four subscribers) at the location of the off premises equipment. A loop executes a process to wait for a poll enable signal (wait for a poll enable 68 and poll received 70). Then, a process 72 is carried out causing the modem 58 to transmit the event numbered data to the IPPV module 32.

Figure 3:
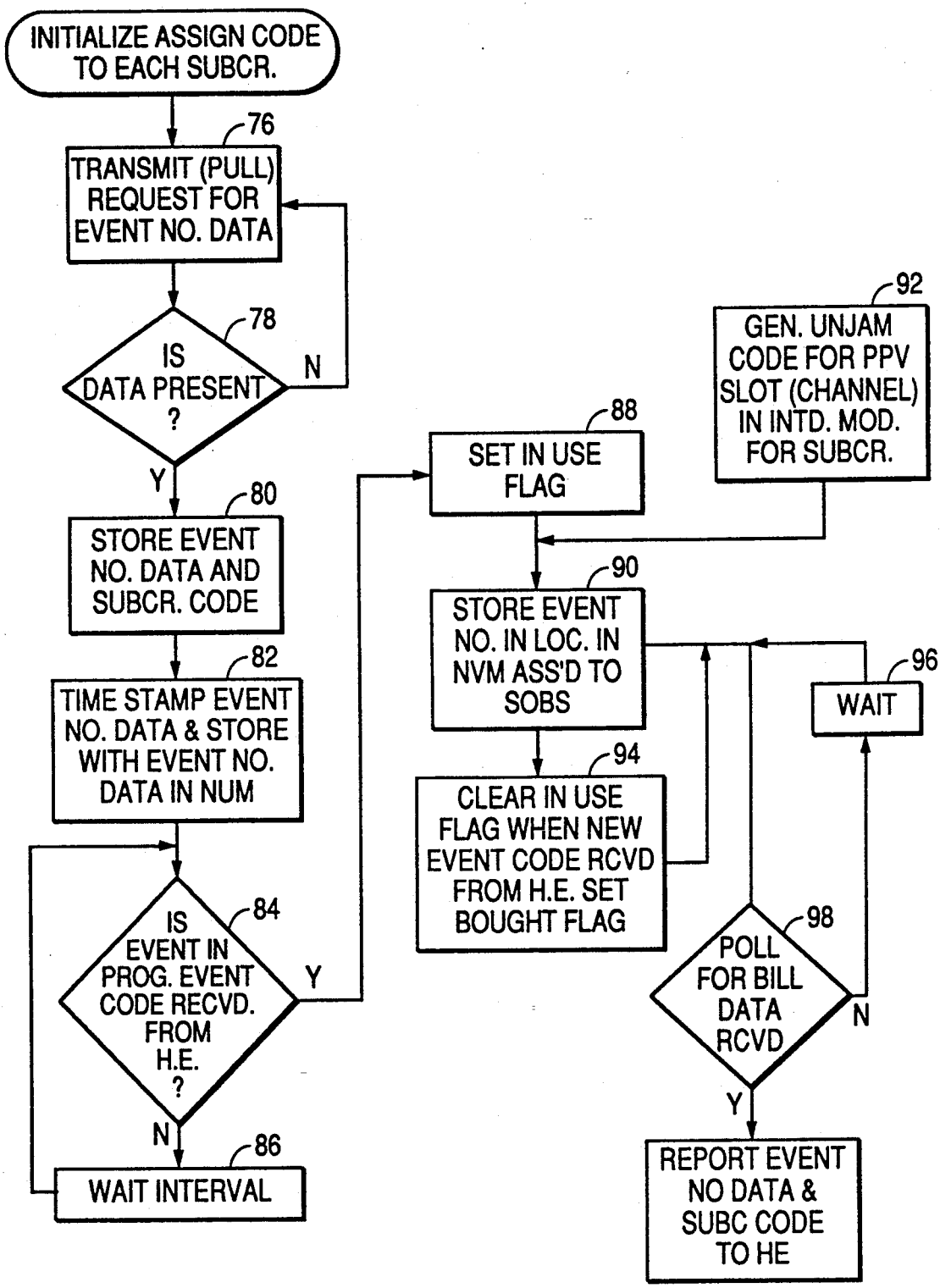

Referring to FIG. 3, it will be noted that upon initialization of the microprocessor in the IPPV module 32, a code (a two bit signal since there are four subscribers at the location 12) is assigned to each subscriber. This code may be used as an address so as to poll the subscribers' terminals 34 and also to address data from the IPPV module 32 to the microprocessor controller and allocate that data to different locations in the NVM 99 allocated to each subscriber. These locations may contain codes identifying the address of the subscriber. These may be multibit codes since there may be thousands of subscribers connected to the CATV distribution system head end via the cable 10 and other cables of the system. Accordingly, it is not necessary for the subscriber or the transaction terminal to generate an authorization number or code. The subscribers' code or address is generated automatically in the operation of the system. In a typical system, there may be thirty-two locations provided in the locations of the NVM 99 for thirty-two different event numbers which may be selected by any subscriber. It is considered desirable to limit the number of PPV programs which can be ordered to a maximum number so as to control the purchases of PPV programming which may be made by any subscriber and limit the obligation of the subscriber for a billing period.

The microprocessor in IPPV module executes a process causing the transmission of the poll requests for event number data (process 76). If data is present 78, a process is carried out to store the event number data and the one out of four subscriber code in the NVM of the module 32. This is shown as process 80 in the FIG. 3 flow chart. The NVM also is provided with a time stamp of the time that the event number data was stored. This time stamp data, since polling occurs approximately every minute, is close to the time of day that the subscriber entered the event number using the terminal 34. This storage process 82 is a progress carried on when time stamp data and event number data is available from the IPPV module microprocessor. The data is stored in the NVM 99 of the microprocessor controller of the module 32.

Either via the RF modem 30 or the addressable link, including the RF demodulator 28, data that an event is in progress, the event number and premium channel or jammer slot of the interdiction circuits 18 is received from the headend. A loop carries out a process at intervals of approximately one second or intervals less than one minute, for example, every one-half second as to whether an event is in progress, 84 (i.e., that an event code in progress is received from the head end at the controller 20). The wait interval 86 may be the intervals between "looks" for event in progress data. When the event is in progress, an in use flag is set 88. The event number is then stored in a location in the NVM 99 assigned to the subscriber 90. The jam signal microprocessor controller 20 recognizes that the in use flag in set and generates the unjamming or enabling code for the PPV slot (the channel) in the interdiction circuits 18 of the interdiction module for the subscriber who selected the event 92. To this end, the controller 32 signals the controller 20 to inhibit the jamming signals in the circuits 18.

When the event code for the next PPV program assigned to the same PPV channel then being viewed is received (or an event over code is received) from the head end a process 94 is carried out clearing the in use flag 88 and setting a bought flag. Micro 32 informs micro 20 to turn on jammers 18.

Later in time when the head end desires to collect billing data, a polling signal is transmitted to the microprocessor controller 32 for data stored in the NVM 99. Polling is carried out at intervals determined by a timer or wait process 96 and may be every hour or every twelve hours. When polling data is received 98, the subscriber address and the event numbers which are bought as indicated by the bought flag are reported to the head end by RF modem 30. There the head end billing computer stores this data and uses it to generate monthly bills.

The head end may transmit prebuy data to the controller 32 or controller 20 over the 108.2 MHz addressable link or the 15–30 MHz data link. This prebuy data is down loaded to the jam signal microprocessor 20 at the start time of the prebuy events. The prebuy command also includes the addresses of the subscribers who prebought PPV programs, for example in the conventional way by calling the cable operator representative by placing a telephone call to the cable operator. Then, the interdiction circuits 18 may be unblocked so that the subscribers which ordered the PPV program can receive the same.

From the foregoing description, it will apparent that there has been provided an improved CATV distribution system having PPV and IPPV capabilities. Variations and modifications in the herein described system within the scope of the invention will undoubtedly suggest themselves to those skilled in the art. Accordingly, the foregoing description should be taken as illustrative and not in a limiting sense.

I claim:

1. A method of providing CATV programs of events broadcast on premium channels over a CATV distribution system having a head end wherein such programs are transmitted during certain periods of time to at least one subscriber connected to the system at a subscriber location, the method comprising the steps of:

distributing to the at least one subscriber a card containing human cognizable information identifying an event and bar-encoded information corresponding thereto which the at least one subscriber can cause to be read if viewing of the identified event is desired by the at least one subscriber, reading the bar-encoded information from the card corresponding to the identified event, thereby generating first digital signals, the first digital signals indicating that the identified event has been selected, transmitting second digital signals from said head end over said distribution system when said selected event is being transmitted from said head end which identifies the selected event and includes an indication that the selected event is in progress, comparing said first digital signals to said second digital signals to determine whether a match exists, and enabling the at least one subscriber to receive a premium channel carrying the selected event when the match exists.

2. The method according to claim 1 further comprising the step of storing said first digital signals, wherein said comparing step is performed after said second digital signals are received from said head end to carry out said enabling step.

3. The method according to claim 1 further comprising a step of transmitting third digital signals corresponding to said first digital signals from said subscriber location to said head end reporting that said selected event has been received so that billing data can be computed therefrom.

4. The method according to claim 3 further comprising the steps of:

generating fourth digital signals indicative of the time of day when the bar-encoded information is read, and transmitting said fourth digital signals with said third digital signals to said head end.

5. The method according to claim 3 wherein reception of said premium channel is normally interdicted, and said enabling step further includes a step of inhibiting the interdiction of the premium channel when said third digital signals are received.

6. The method of claim 1 further comprising the step of:

transmitting signals corresponding to said first digital signals from said subscriber location back to said head end.

7. The method according to claim 6 wherein said step of transmitting said signals corresponding to said first digital signals is carried out over said distribution system.

8. Apparatus for providing CATV programs of events broadcast on premium channels over a CATV distribution system having a head end wherein such programs are transmitted during certain periods of time to at least one subscriber connect to the system at a subscriber location, the apparatus comprising:

means for reading a card distributed to the at least one subscriber, the card containing human cognizable information identifying an event and bar-encoded information corresponding thereto which the at least one subscriber can cause to be read if viewing of the identified event is desired by the at least one subscriber, means for decoding the bar-encoded information from the card corresponding to the identified event, thereby generating first digital signals, the first digital signals indicating that the identified event has been selected, means for transmitting second digital signals from said head end over said distribution system when said selected event is being transmitted from said head end which identifies the selected event and includes an indication that the selected event is in progress, means for comparing said first digital signals to said second digital signals to determine whether a match exists, and means for enabling the at least one subscriber to receive a premium channel carrying the selected event when the match exists.

9. The apparatus according to claim 8 further comprising means for storing said first digital signals, wherein said comparing means compares said first digital signals after said second digital signals are received to carry out said enabling step.

10. The apparatus according to claim 8 further comprising:
means for transmitting, in response to said first digital signals, third digital signals from said subscriber location to said head end reporting that said event has been received so that billing data can be computed therefrom.

11. The apparatus according to claim 10 further comprising:
means for generating fourth digital signals indicative of the time of day when the bar-encoded information is decoded, and
means for transmitting said fourth digital signals with said third digital signals to said head end.

12. The apparatus according to claim 10 further comprising:
means for normally interdicting the reception of the premium channel, and
means included in said enabling means for inhibiting the interdiction of the premium channel when said third digital signals are received.

13. The apparatus of claim 8, further comprising:
means for transmitting signals corresponding to said first digital signals from said subscriber location back to said headend.

14. The apparatus according to claim 13, wherein said means for transmitting signals corresponding to said first digital signals includes means for using said distribution system to carry said first digital signals to said head end.

* * * * *